United States Patent
Goldberg

(10) Patent No.: US 12,194,951 B2
(45) Date of Patent: Jan. 14, 2025

(54) VEHICULAR SAFETY RESTRAINT APPARATUS AND METHODS FOR PETS

(71) Applicant: Ruff Rider Products, Inc., Paonia, CO (US)

(72) Inventor: Carl L. Goldberg, Paonia, CO (US)

(73) Assignee: Ruff Rider Products, Inc., Paonia, CO (US)

(*) Notice: Subject to any disclaimer, the term of this patent is extended or adjusted under 35 U.S.C. 154(b) by 41 days.

(21) Appl. No.: 17/803,449

(22) Filed: Jul. 13, 2022

(65) Prior Publication Data

US 2024/0017693 A1 Jan. 18, 2024

(51) Int. Cl.
*B60R 22/10* (2006.01)
*A01K 1/02* (2006.01)

(52) U.S. Cl.
CPC ............ *B60R 22/10* (2013.01); *A01K 1/0272* (2013.01)

(58) Field of Classification Search
CPC .............................. B60R 22/10; A01K 1/0272
See application file for complete search history.

(56) References Cited

U.S. PATENT DOCUMENTS

| | | |
|---|---|---|
| 2,187,021 A | 1/1940 | Everson |
| 4,907,541 A | 3/1990 | Thompson |
| 5,154,660 A | 10/1992 | Snyder et al. |
| 5,335,627 A | 8/1994 | Bandimere |
| 5,359,964 A | 11/1994 | Sporn |
| 5,427,061 A | 6/1995 | McCullough |
| 5,511,515 A * | 4/1996 | Brown ............... A01K 27/002 119/864 |
| 5,676,093 A | 10/1997 | Sporn |
| 5,743,216 A | 4/1998 | Holt, Jr. |
| 5,794,571 A | 8/1998 | Goldberg |
| 5,915,335 A | 6/1999 | Holt, Jr. |
| 6,161,505 A | 12/2000 | Noguero |
| 6,450,130 B1 | 9/2002 | Goldberg |
| 7,311,063 B2 | 12/2007 | Goldberg |

FOREIGN PATENT DOCUMENTS

| | | | | |
|---|---|---|---|---|
| EP | 1607284 A1 | * 12/2005 | ............ | B60R 22/10 |
| WO | WO-9202128 A1 | * 2/1992 | | |
| WO | WO-0034086 A1 | * 6/2000 | ........... | B60R 22/105 |
| WO | WO-2009062273 A1 | * 5/2009 | ........... | A01K 1/0263 |

* cited by examiner

*Primary Examiner* — Timothy J Brindley
(74) *Attorney, Agent, or Firm* — James R. Young; Cochran Freund & Young LLC

(57) ABSTRACT

Apparatus and methods are disclosed for providing pet restraint while riding in a vehicle for enhancing pet and passenger safety. The apparatus of this invention includes a dual loop harness and a vehicle seatbelt receiving loop having a reinforced tongue extending from a securement intersection with the harness a selected distance along the receiving loop thereby establishing a selected receiving loop cant. The methods of this invention are directed to steps for forming the apparatus.

20 Claims, 9 Drawing Sheets

VEHICULAR SAFETY RESTRAINT APPARATUS AND METHODS FOR PETS

FIELD OF THE INVENTION

This invention relates to vehicular passenger safety restraints, and, more particularly, relates to pet harnesses for use in association with vehicle seatbelt systems.

BACKGROUND OF THE INVENTION

It is estimated that 84% of pets (primarily dogs) are unrestrained while traveling in a vehicle (over 80% of dog owners drive with their pet in their vehicle). Surveys have shown that attention to pets while driving, particularly when unrestrained, is a significant source of driver distraction which is a leading cause of vehicular accidents. While there are no direct statistics regarding pet injury and fatality in vehicular accidents, by extrapolation from other vehicle crash data it is estimated that more than 10,000 dogs are in accidents each year, a great many of which are likely either injured or killed.

At the same time, vehicle passengers are endangered too if an accident occurs with an unrestrained animal in the same cab location as other passengers. If a vehicle crashes at a speed of just 25 mph, an unrestrained dog can be projected forward at a force equal to 40 times its weight. A large-size dog weighing 75 lbs., for example, can achieve an impact force of 3,000 pounds in such a crash, which could be a lethal blow for both a passenger and the pet. Even for smaller pets traveling at just 30 mph, an unrestrained 10 lb dog will exert 300 pounds of pressure in an accident, which can injure or kill passengers and severely injure or kill the animal.

A wide variety of restraint harnesses have heretofore been suggested and/or utilized for pets in vehicles (see, for example, U.S. Pat. Nos. 5,427,061, 5,443,037, 5,794,571, 5,915,335, 6,101,979, 6,450,130, and 7,311,063). However field and crash testing have shown various shortcomings in restraint/harness durability, break resistance, travel distance of a restrained animal during a crash, or ease and adaptability in use. It has been therefore found that further improvement is necessary in some cases and thus could still be utilized to improve pet and passenger safety.

SUMMARY OF THE INVENTION

This invention provides improved apparatus and methods for pet restraint and thus overall vehicle cab safety during travel. The apparatus is durable and highly resistant to break or tear in a crash, improves (reduces) travel distance of a restrained animal during a crash, is easy to use, and is adaptable to a variety of uses and application environments.

The vehicular safety restraint apparatus of this invention is configure for mounting on a pet and is engageable by a vehicle seatbelt. The apparatus includes a harness and a vehicle seatbelt receiving structure, the harness having a pet head receiving loop formation and pet body receiving loop formation. The loop formations are secured together and at their combined loop formation ends at an intersection thereby defining left and right pet foreleg receiving harness elements. The vehicle seatbelt receiving structure includes a first portion wrapped around the intersection and secured to the ends of each of the loop formations thereat. A second portion defines a vehicle seatbelt receiving loop having a selected circumference adjacent to the intersection. The second portion has a reinforced tongue segment extending from the intersection a selected distance along the second portion thereby establishing a selected (forward) cant of the second portion and thus the receiving loop.

The harness loop formations are formed from a first length of webbing secured to itself. The vehicle seatbelt receiving structure is likewise formed from a second length of webbing having first and second webbing ends, the second length of webbing folded back on and secured to itself thereby forming a plural ply webbing tongue extending from the intersection a selected distance in a direction forward of the head receiving loop formation. The first webbing end of the second length of webbing is secured at the intersection and the second webbing end of the length of webbing is secured to the webbing tongue thereby defining the vehicle seatbelt receiving loop.

The methods for forming a vehicular restraining apparatus mountable on a pet and engageable by a vehicle seatbelt of this invention include the steps of cutting a first selected length of webbing and securing it to itself at selected intermediate locations along the webbing thereby defining a first harness loop and a second harness loop formation each having ends spaced from the secured locations. The ends are secured to one another at an intersection. A second selected length of webbing is cut thus establishing first and second webbing ends thereof, the first webbing end secured at the intersection so that the second selected length of webbing extends across the intersection. The second length of webbing is extended from the intersection a selected distance and folded back on itself after the selected distance forming a tongue extending from the intersection, then wrapped around the intersection and the tongue. The wrapped webbing is secured at the intersection forming a first multi-ply webbing structure at the intersection. The tongue and second webbing end are secured together to form a second multi-ply webbing structure and a vehicle seatbelt receiving loop adjacent to the intersection and the tongue.

It is therefore an object of this invention to provide apparatus and methods for improved restraint and overall cab safety when a pet is being transported in a vehicle.

It is another object of this invention to provide apparatus and methods for pet restraint in a vehicle that improve restraint/harness durability, break resistance, travel distance of a restrained animal during a crash, and ease and adaptability of use.

It is still another object of this invention to provide a vehicular safety restraint apparatus mountable on a pet and engageable by a vehicle seatbelt, the apparatus including a harness having a pet head receiving loop formation and pet body receiving loop formation, the loop formations secured together at a selected location, the head receiving loop formation and the body receiving loop formation having ends spaced from the location, the ends of each of the loop formations secured to one another at an intersection thereby defining left and right pet foreleg receiving harness elements, and a vehicle seatbelt receiving structure including a first portion wrapped around the intersection and secured to the ends of each of the loop formations thereat and a second portion defining a vehicle seatbelt receiving loop having a selected circumference adjacent to the intersection, the second portion including a reinforced tongue segment extending from the intersection a selected distance along the second portion thereby establishing a selected cant of the receiving loop.

It is yet another object of this invention to provide a vehicular safety restraint apparatus mountable on a dog and engageable by a vehicle seatbelt, the apparatus including a harness having a dog head receiving harness loop formation and dog body receiving harness loop formation formed from a first length of webbing secured to itself at a selected location along the webbing thereby defining the head receiving harness loop formation and the body receiving harness loop formation each extending from the location, the head receiving and body receiving harness loop formations having ends spaced from the webbing location, the ends of each of the harness loop formations secured to one another at an intersection thereby defining left and right dog foreleg receiving harness elements, and a vehicle seatbelt receiving structure formed from a second length of webbing having first and second webbing ends, the second length of webbing wrapped around the intersection and secured to the ends of each of the harness loop formations thereat and folding back on and secured to itself thereby forming a plural ply webbing tongue extending from the intersection a selected distance in a direction forward of the dog head receiving harness loop formation, the first webbing end of the second length of webbing secured at the intersection and the second webbing end of the length of webbing secured to the plural ply webbing tongue thereby defining a vehicle seatbelt receiving loop of the vehicle seatbelt receiving structure at the intersection having a selected circumference and forward loop cant.

It is still another object of this invention to provide a method for forming a vehicular restraining apparatus mountable on a pet and engageable by a vehicle seatbelt, the method including cutting a first selected length of webbing, securing the first selected length of webbing to itself at selected intermediate locations along the webbing thereby defining a first harness loop and a second harness loop formation each having ends spaced from the secured locations, securing the ends of the first harness loop and the second harness loop formation to one another at an intersection, cutting a second selected length of webbing establishing first and second webbing ends, securing the first webbing end of the second selected length of webbing at the intersection so that the second selected length of webbing extends across the intersection, extending the second selected length of webbing from the intersection a selected distance, folding the second selected length of webbing back on itself after the selected distance forming a tongue extending from the intersection, wrapping the second selected length of webbing around the intersection and the tongue, securing the wrapped webbing at the intersection forming a first multi-ply webbing structure at the intersection, and securing together the tongue and the second webbing end of the second selected length of webbing to form a second multi-ply webbing structure and a vehicle seatbelt receiving loop adjacent to the intersection and the tongue, whereby the vehicle seatbelt receiving loop is canted in a direction forward of the intersection.

With these and other objects in view, which will become apparent to one skilled in the art as the description proceeds, this invention resides in the novel construction, combination, and arrangement of parts and methods substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

Figure 1:
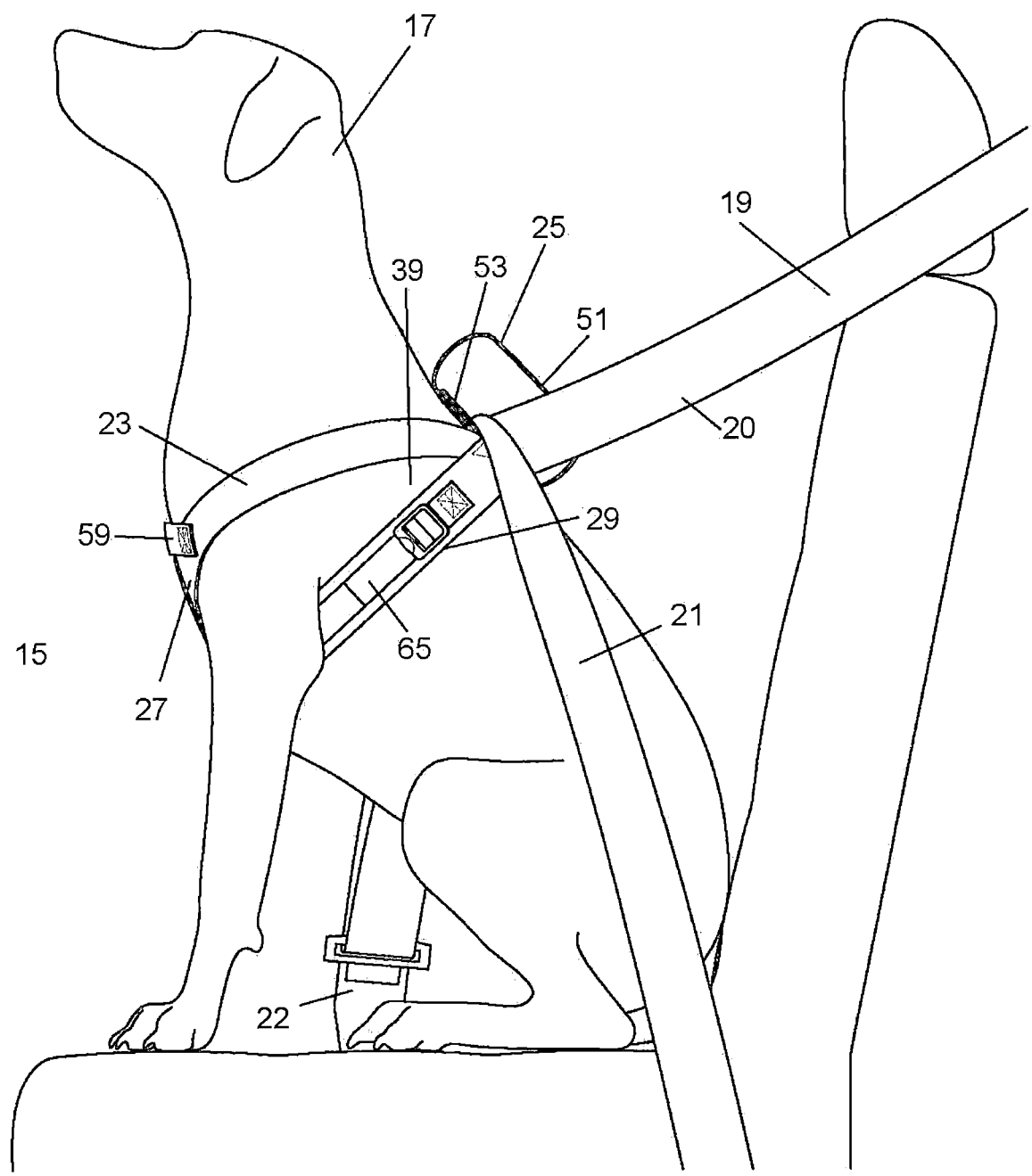
FIG. 1 is a perspective view showing the vehicular pet safety restraint apparatus of this invention in use to restrain a dog using a vehicle's seatbelt system.
Figure 2:
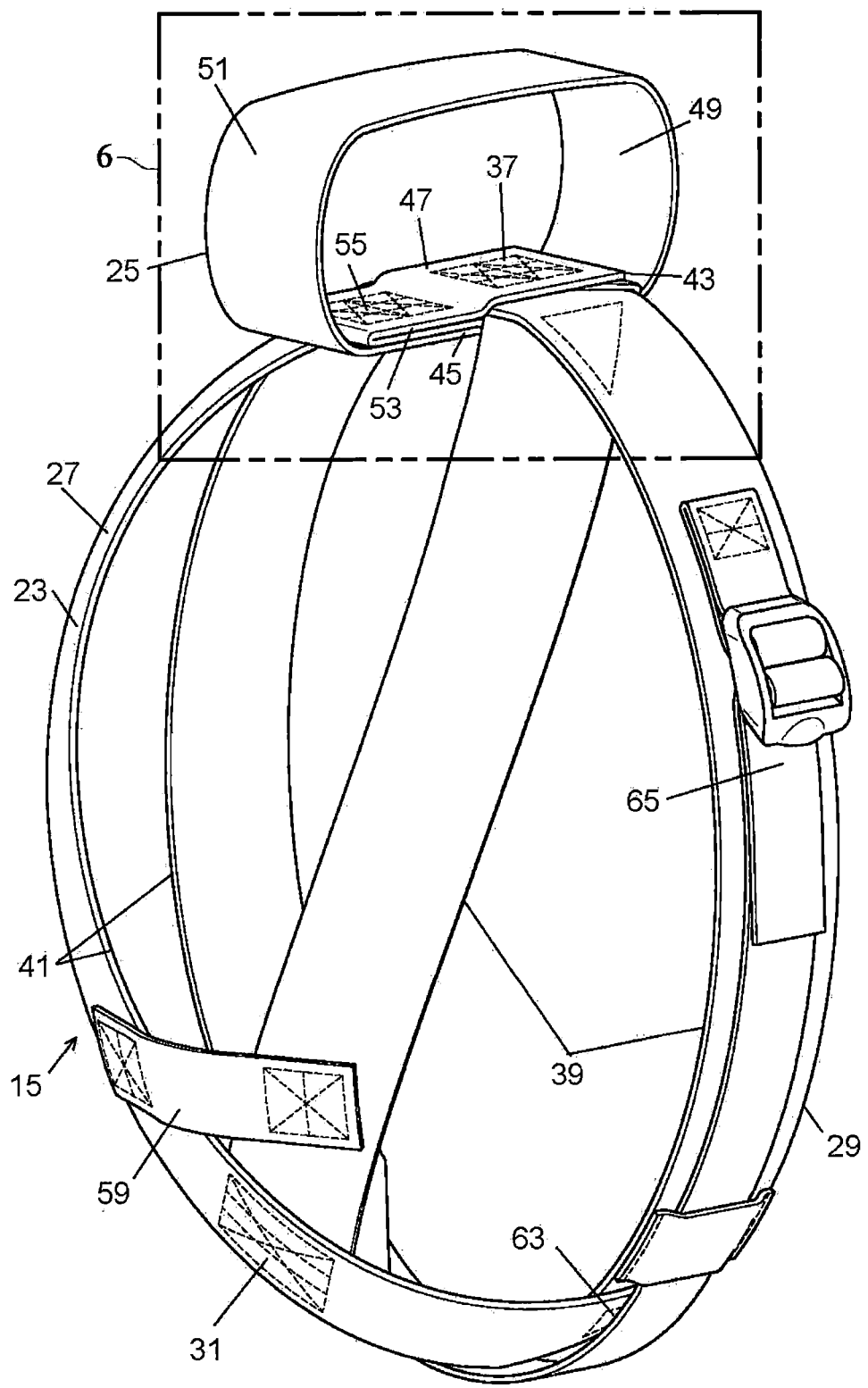
FIG. 2 is another perspective view of the pet safety restraint apparatus of this invention.
Figure 3:
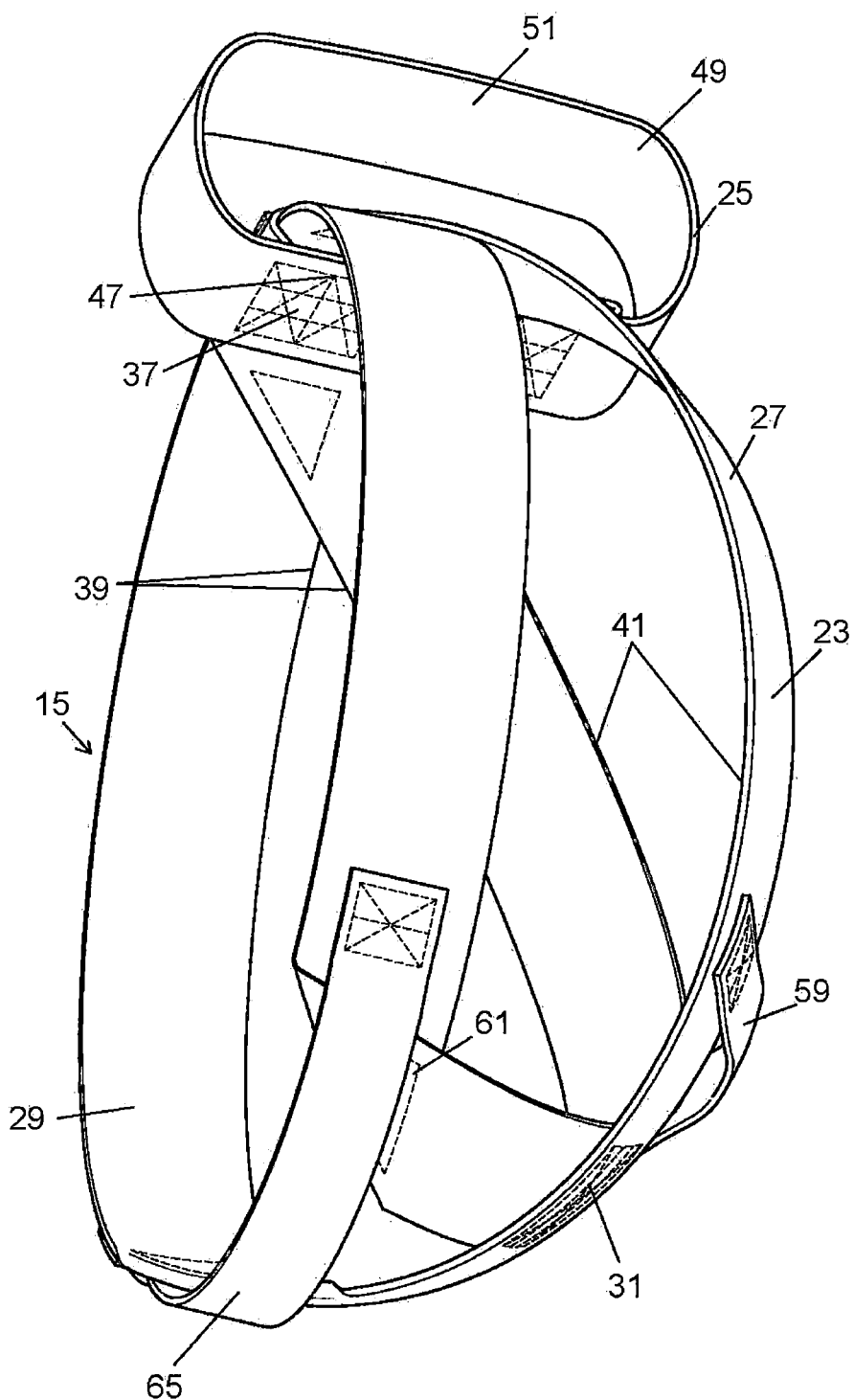
FIG. 3 is a third perspective view of the apparatus as shown in FIG. 2.
Figure 4:
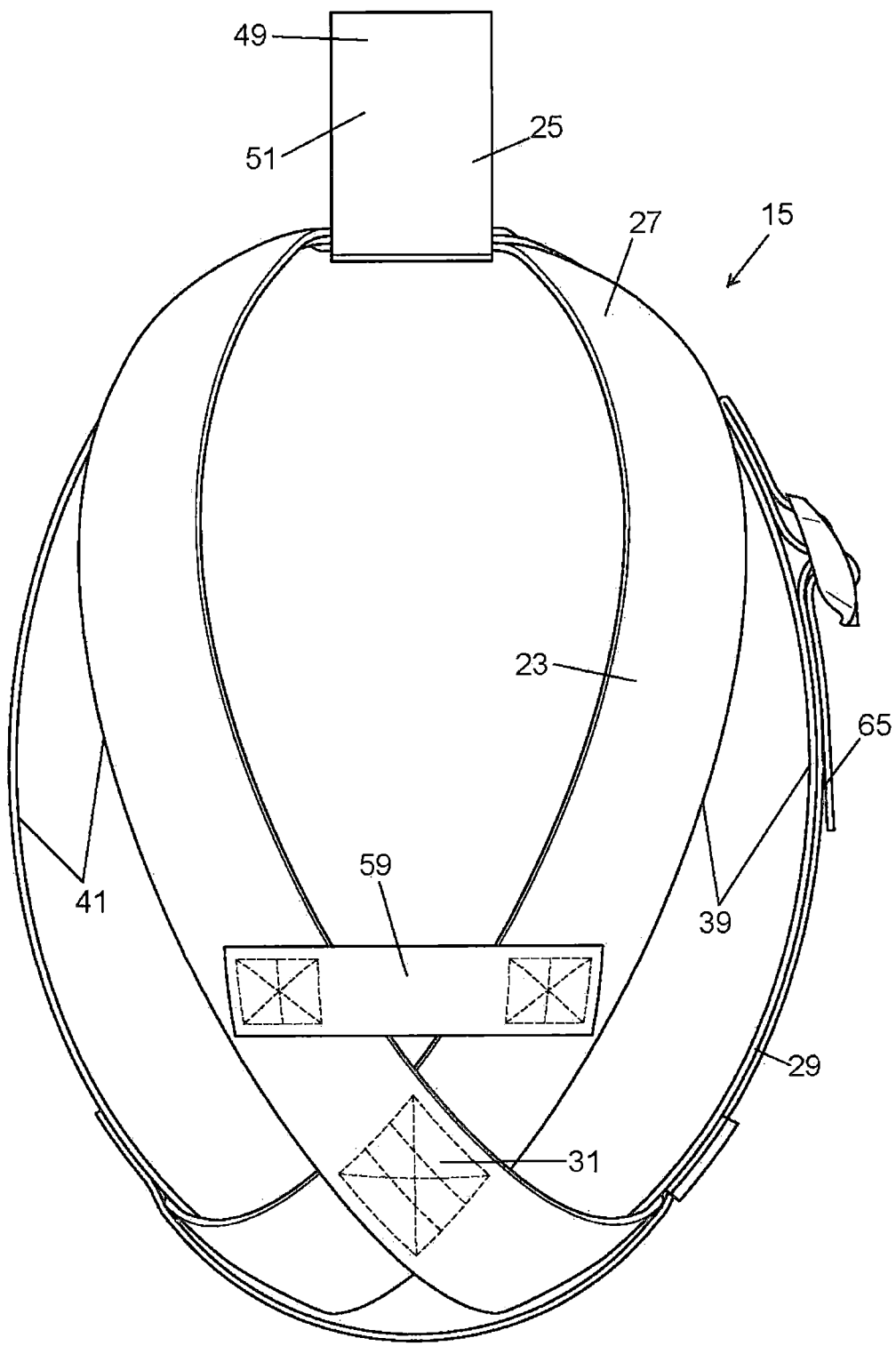
FIG. 4 is a front view of the apparatus shown in FIG. 2.
Figure 5:
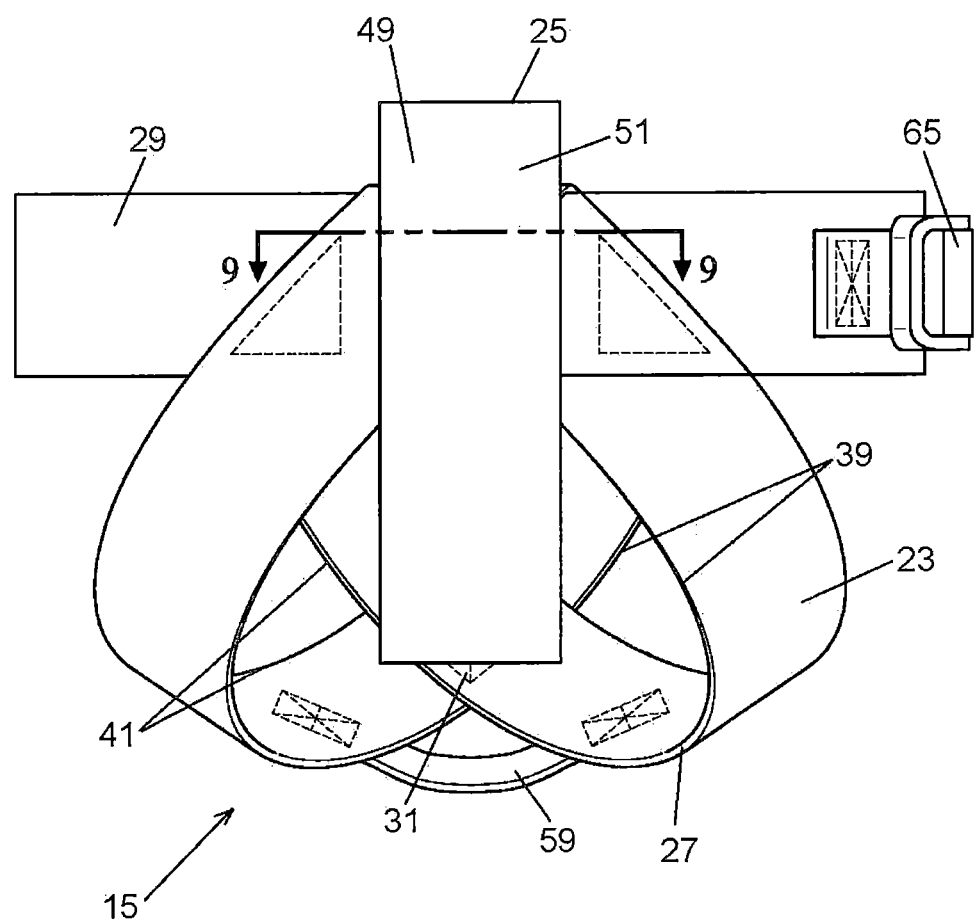
FIG. 5 is a top view of the apparatus shown in FIG. 2.

The vehicular safety restraint apparatus 15 mounted on a pet dog 17 and engageable by a vehicle seatbelt 19 (having a shoulder belt 20, lap belt 21 and buckle mechanism 22 as is conventional) is shown in FIG. 1. Apparatus 15 includes harness 23 and vehicle seatbelt receiving structure 25. Harness 23 is characterized by pet head receiving loop formation 27 and pet body receiving loop formation 29 preferably formed from a single length of webbing selected to facilitate selected harness size.

As shown in FIGS. 2 through 5, loop formations 27 and 29 are formed by securing the webbing together (sewing) at a selected location 31. Once secured together the loop formations 27 and 29 each have defined ends 33 and 35/36 (webbing terminal ends at loop formation 29), respectively, spaced from location 31, the ends of each of the loop formations secured to one another at intersection 37 (see FIGS. 6 through 9). Left and right pet foreleg receiving harness elements 39 and 41 are thus defined thereby.

Vehicle seatbelt receiving structure 25 is formed of a length of webbing of selected length between webbing ends 43 and 45 to accommodate routing and size limitations discussed hereinafter. First portion 47 thereof (see FIGS. 2, 3 and 6 through 9) is routed (wrapped) around intersection 37 and ultimately secured (sewn) to ends 33 and 35/36 of each of loop formations 27 and 29, respectively, at end 43 thereat, in so doing essentially becoming a part of the five ply webbing structure of intersection 37 (see FIGS. 8 and 9). A second portion 49 of structure 25 defines vehicle seatbelt receiving loop 51 having a selected circumference (preferably no greater than about 32 cm) adjacent to intersection 37.

Second portion 49 has a reinforced tongue segment 53 extending from intersection 37 a selected distance along second portion/receiving loop 49/51. Tongue segment 53 is defined in part by extending the webbing of first portion 47 from intersection 37 a selected distance 55 and folding the webbing back on itself and back across the selected distance 55 as well as across intersection 37 (where it is secured as discussed above). Folded webbing along the selected distance 55 and webbing end 45 are secured along selected distance 55 (sewn) thereby establishing tongue segment 53, a three webbing ply structure. Reinforced tongue segment 53 thereby establishes a selected forward cant of second portion/receiving loop 49/51 relative to loop formations 27 and 29 and intersection 37.

Figure 6:
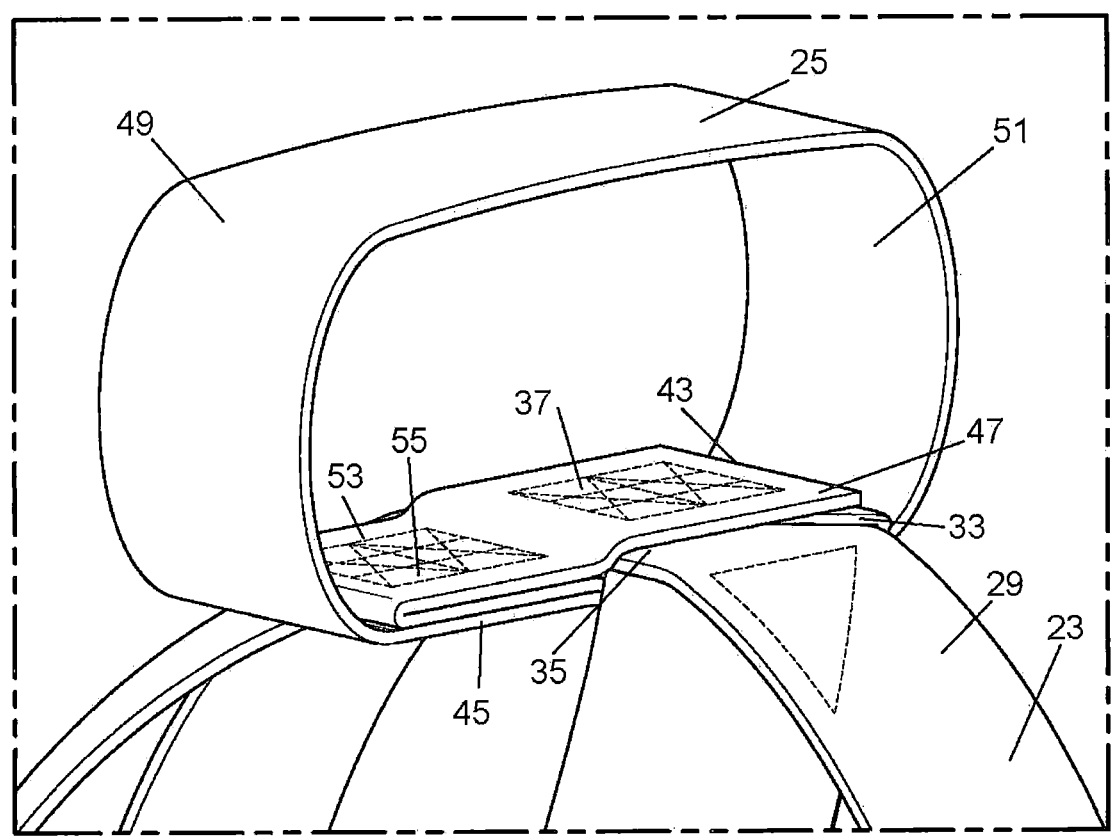
FIG. 6 is a detail perspective view of the seatbelt receiving structure and harness engagement of the apparatus of this invention taken from FIG. 2.
Figure 7:
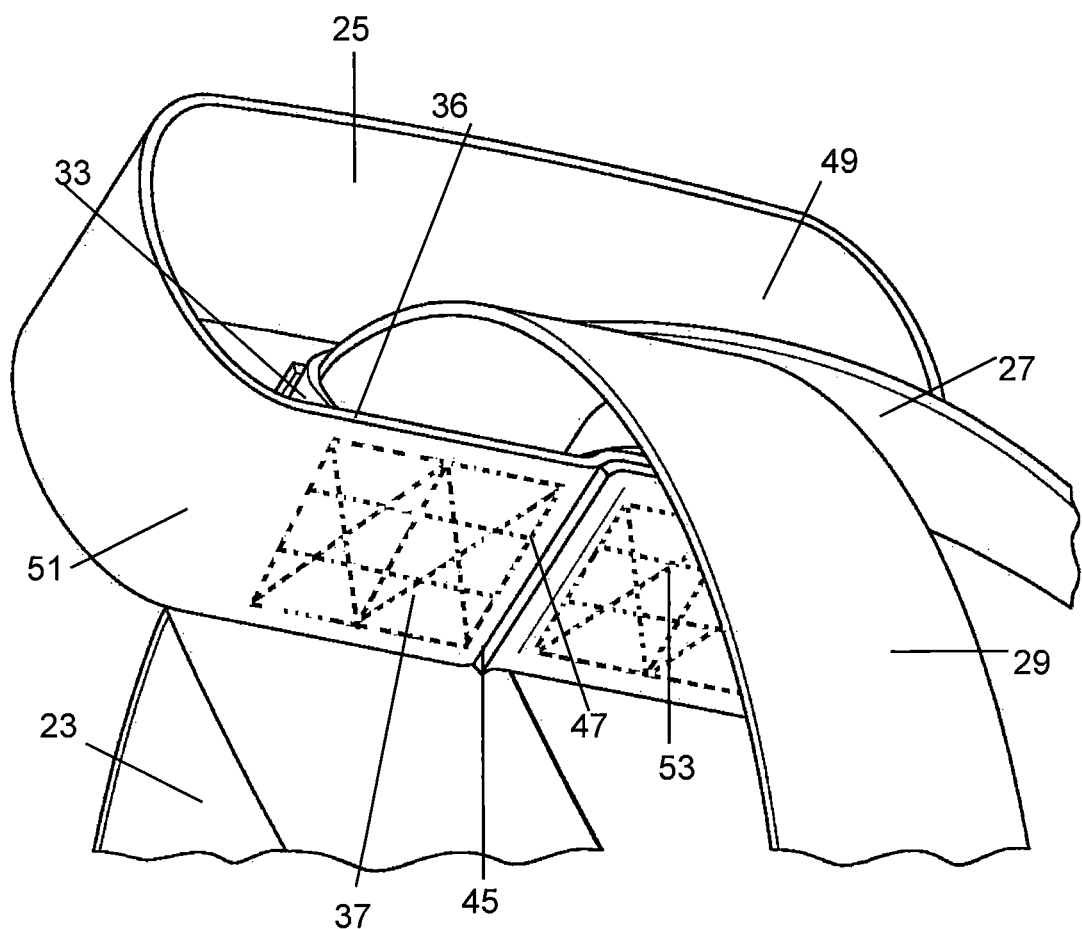
FIG. 7 is another detail perspective view of the seat belt receiving structure and harness engagement in the apparatus of this invention.
Figure 8:
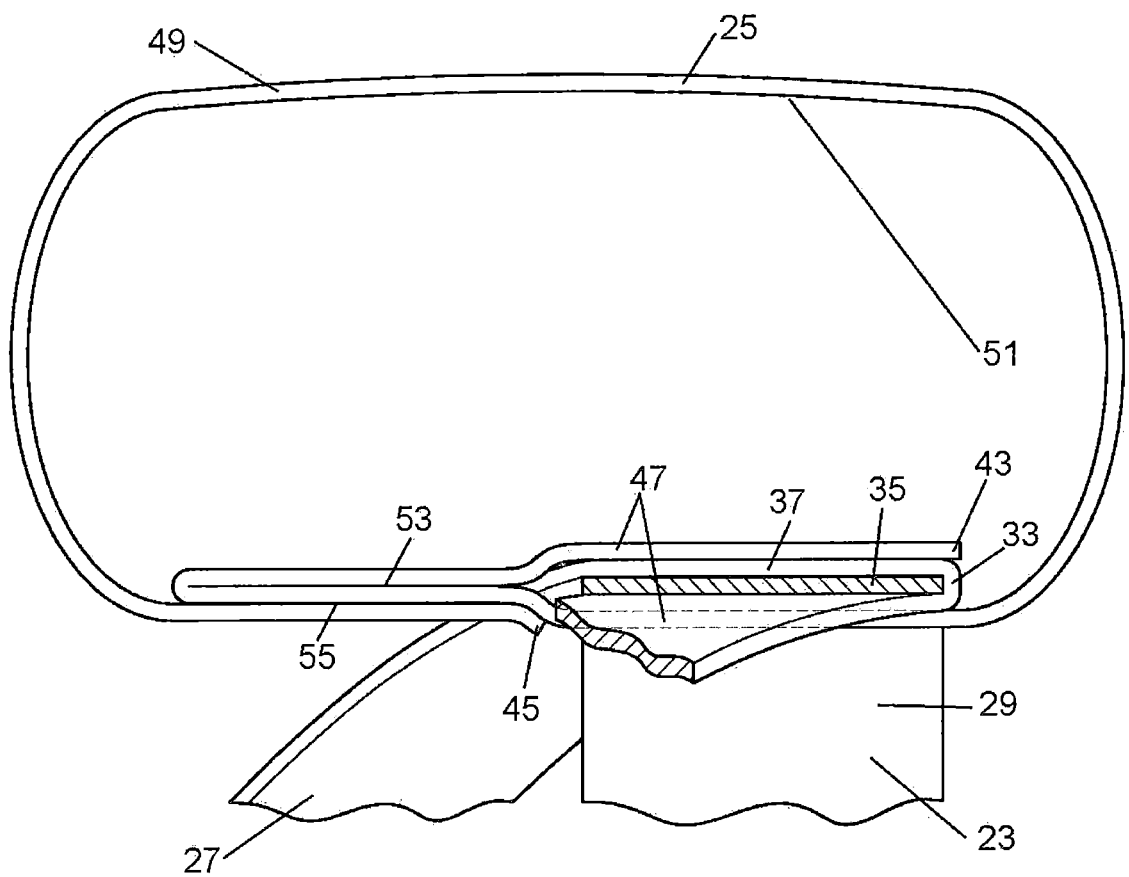
FIG. 8 is a section view illustration further detailing receiving structure and harness engagement in the apparatus of this invention.
Figure 9:
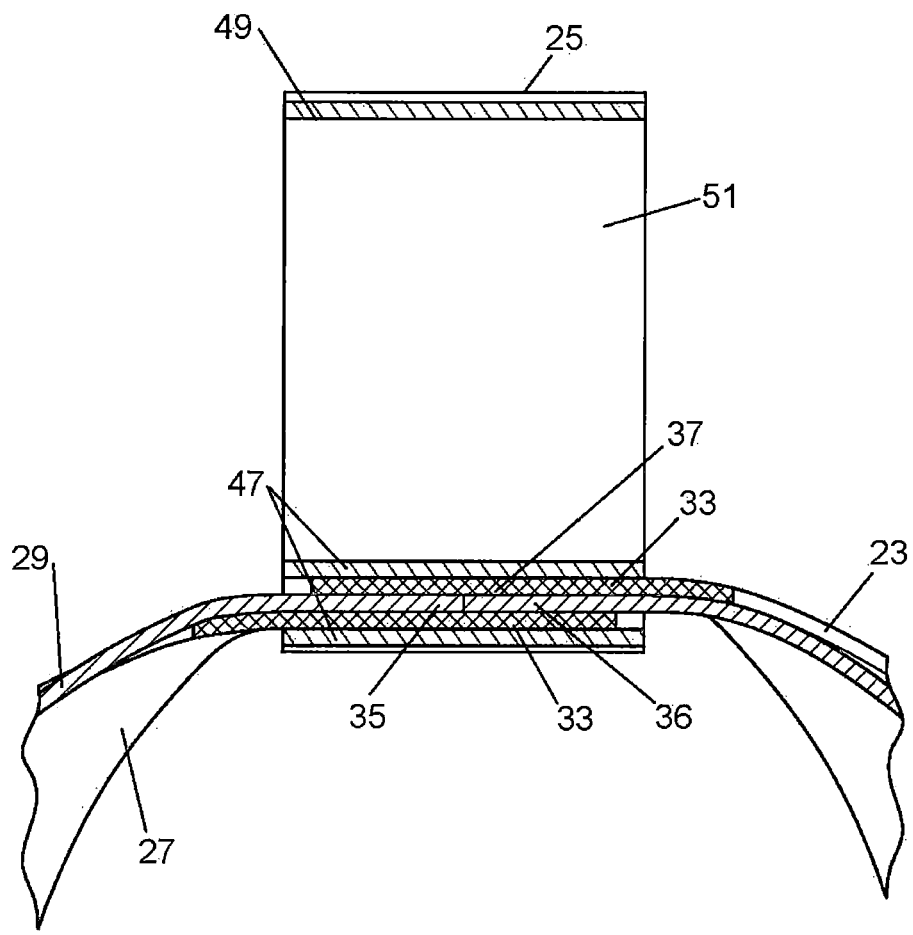
FIG. 9 is a section view taken from section lines 9-9 of FIG. 5.

The webbing used to make harness 23 and vehicle seatbelt receiving structure 25 has a width preferably about 1.75" and is preferably made of woven nylon webbing material meeting milspec class 2, type 7 specifications with a 6,000 to 10,000 pound load bearing strength. Selected distance 55 is preferably at least equivalent to the webbing width. As shown in FIGS. 1, 6 and 8, vehicle seatbelt receiving loop 51 is oriented to reside above harness 23 extending perpendicularly relative to body receiving loop formation 29 of harness 23 at intersection 37, tongue segment 53 thus extending in a direction toward the pet's head when apparatus 15 is mounted on the pet.

Harness 23 includes breast strapping 59 secured (sewn) across loop formation 27 of the harness. While not shown a "D" ring for a leash could be positioned on breast strap 51. Webbing redirecting folds 61 and 63 are formed (folded and sewn) in opposing positions at loop formation 29 (see FIGS. 2 and 3) of harness 23. Torso strapping arrangement 65 is secured (sewn) at loop formation 27 adjacent to redirecting folds 61 and 63 for adjustably refining fit on the animal thereat. Various configurations of arrangement 65 could be utilized including strap and buckle type as shown, or cinch, elastic or other configurations sufficient to the task.

Apparatus 15 is made by cutting a first selected length of webbing and securing (sewing) it to itself at selected intermediate locations along the webbing. This defines a first harness loop and a second harness loop formation, each having ends spaced from the location of self securement. The ends are secured (sewn) to one another at an intersection. A second selected length of webbing is cut, thus defining first and second ends thereof. The first end of the second length of webbing is secured to the intersection so that the second selected length of webbing extends across the intersection and a selected distance therebeyond.

The second length is folded back on itself after the selected distance forming a tongue extending from the intersection and is then wrapped beneath the intersection and around both the intersection and the tongue. The wrapped webbing is secured (sewn) at the intersection forming a first multi-ply webbing structure at the intersection. The tongue and the second webbing end of the second length of webbing are secured (sewn) forming a second multi-ply webbing structure and a vehicle seatbelt receiving loop adjacent to the intersection and the tongue. This structure cants the vehicle seatbelt receiving loop in a direction forward of the intersection. Breast and torso strap sets are secured (sewn) as shown in the FIGURES.

All securements are preferably made by various known sewing techniques adopted to assure integrity of the harness and receiving structure assembly in a crash using, for example, 69 to 92 (preferably 90) weight nylon thread and box x, triangle and bartack stitching and/or combinations thereof. Box x stitching is about ¾"×1". Bartacks are typically about ¾" by about ⅛" and have been found to be especially effective used in sets of four across a box x structure. Smaller box x and bartacks for torso and breast strapping (typically 1" nylon webbing) are utilized. Various adhesives can be utilized to further assure integrity of the securements.

As shown in FIG. 1, loop formation 27 is received over the animal's head and around the neck/breast area, loop formation 29 being received behind the animal's forelegs and across and around the animal's torso. The animal's forelegs are received through harness elements 39 and 41. Overall, this design mitigates the amount of harness stretch which, in combination with the forward cant of seat belt receiving loop 51, reduces forward motion and redirects overload forces on impact so that energy is redirected into apparatus 15 and not the pet. Use of bartacks in the box x stitch as shown increases the stitching tensile strength (to about a 2400 lb break point).

In crash testing on a 75 lb dog manikin, a maximum excursion measurement (travel distance) of 34.9" was found. On a 45 lb manikin a maximum excursion measurement of 31.1" was reported. These measurements are both within accepted standards in the industry.

As may be appreciated from the foregoing, an improved vehicular safety restraint apparatus and methods for forming the same for use with vehicle seatbelt systems is provided that enhances safety and security of a pet in the apparatus and passengers while riding in a vehicle cab with the animal. The apparatus is durable and highly break resistant, reduces travel distance of a restrained animal during a crash, and is easy to manipulate and use.

What is claimed is:

1. A vehicular safety restraint apparatus mountable on a pet and engageable by a vehicle seatbelt, said apparatus comprising:
   a harness including a pet head receiving loop formation and pet body receiving loop formation, said loop formations secured together at a selected location, said head receiving loop formation and said body receiving loop formation having ends spaced from said location, said ends of each of said loop formations secured to one another at an intersection thereby defining left and right pet foreleg receiving harness elements; and
   a vehicle seatbelt receiving structure including a first portion wrapped around said intersection and secured to said ends of each of said loop formations thereat and a second portion defining a vehicle seatbelt receiving loop having a selected circumference extending in opposite directions from said intersection upwardly and over said intersection, said second portion including a reinforced tongue segment extending in one of said opposite directions from said intersection a selected distance along said second portion thereby establishing a selected cant of said receiving loop.

2. The vehicular safety restraint apparatus of claim 1 wherein said selected circumference of said second portion of said vehicle seatbelt receiving structure is no greater than about 32 cm.

3. A vehicular safety restraint apparatus mountable on a pet and engageable by a vehicle seatbelt, said apparatus comprising:
   a harness including a pet head receiving loop formation and pet body receiving loop formation, said loop formations secured together at a selected location, said head receiving loop formation and said body receiving loop formation having ends spaced from said location, said ends of each of said loop formations secured to one another at an intersection thereby defining left and right pet foreleg receiving harness elements; and
   a vehicle seatbelt receiving structure including a first portion wrapped around said intersection and secured to said ends of each of said loop formations thereat and a second portion defining a vehicle seatbelt receiving loop having a selected circumference adjacent to said intersection, said second portion including a reinforced tongue segment extending from said intersection a selected distance along said second portion thereby establishing a selected cant of said receiving loop, wherein said vehicle seatbelt receiving structure is formed from a length of webbing having a webbing width, wherein said selected distance is at least equivalent to said webbing width, and wherein said vehicle seatbelt receiving loop defined by said second portion of said vehicle seatbelt receiving structure is oriented to reside above said harness extending perpendicularly relative to said body receiving loop formation of said harness at said intersection, said tongue segment extending in a direction toward the pet's head when said apparatus is mounted on the pet.

4. A vehicular safety restraint apparatus mountable on a pet and engageable by a vehicle seatbelt, said apparatus comprising:

a harness including a pet head receiving loop formation and pet body receiving loop formation, said loop formations secured together at a selected location, said head receiving loop formation and said body receiving loop formation having ends spaced from said location, said ends of each of said loop formations secured to one another at an intersection thereby defining left and right pet foreleg receiving harness elements; and a vehicle seatbelt receiving structure including a first portion wrapped around said intersection and secured to said ends of each of said loop formations thereat and a second portion defining a vehicle seatbelt receiving loop having a selected circumference adjacent to said intersection, said second portion including a reinforced tongue segment extending from said intersection a selected distance along said second portion thereby establishing a selected cant of said receiving loop, wherein said vehicle seatbelt receiving structure is formed from a length of webbing having first and second webbing ends, said length of webbing folding back on and secured to itself and at said intersection forming said reinforced tongue segment thus characterized by a multi-ply webbing formation thereat, said first webbing end of said length of webbing secured at said intersection and said second webbing end of said length of webbing secured to said reinforced tongue segment.

5. A vehicular safety restraint apparatus mountable on a pet and engageable by a vehicle seatbelt, said apparatus comprising:

a harness including a pet head receiving loop formation and pet body receiving loop formation, said loop formations secured together at a selected location, said head receiving loop formation and said body receiving loop formation having ends spaced from said location, said ends of each of said loop formations secured to one another at an intersection thereby defining left and right pet foreleg receiving harness elements; and a vehicle seatbelt receiving structure including a first portion wrapped around said intersection and secured to said ends of each of said loop formations thereat and a second portion defining a vehicle seatbelt receiving loop having a selected circumference adjacent to said intersection, said second portion including a reinforced tongue segment extending from said intersection a selected distance along said second portion thereby establishing a selected cant of said receiving loop, wherein said intersection has a resulting five webbing ply structure and wherein said reinforced tongue segment has a resulting three webbing ply structure.

6. The vehicular safety restraint apparatus of claim 1 further comprising breast strapping secured across said head receiving loop formation of said harness.

7. The vehicular safety restraint apparatus of claim 1 wherein said harness is formed from a length of webbing and wherein said end of said pet body receiving loop formation has first and second webbing terminal ends located and secured at said intersection.

8. The vehicular safety restraint apparatus of claim 7 wherein webbing redirecting folds are formed in said pet body receiving loop formation of said harness, said harness further comprising a torso strapping arrangement associated with said pet body receiving loop formation adjacent to said redirecting folds for adjustably refining fit thereat.

9. A vehicular safety restraint apparatus mountable on a dog and engageable by a vehicle seatbelt, said apparatus comprising:

a harness including a dog head receiving harness loop formation and dog body receiving harness loop formation formed from a first length of webbing secured to itself at a selected location along said webbing thereby defining said head receiving harness loop formation and said body receiving harness loop formation each extending from said location, said head receiving and body receiving harness loop formations having ends spaced from said webbing location, said ends of each of said harness loop formations secured to one another at an intersection thereby defining left and right dog foreleg receiving harness elements; and a vehicle seatbelt receiving structure formed from a second length of webbing having first and second webbing ends, said second length of webbing wrapped around said intersection and secured to said ends of each of said harness loop formations thereat and folding back on and secured to itself thereby forming a plural ply webbing tongue extending from said intersection a selected distance in a direction forward of said dog head receiving harness loop formation, said first webbing end of said second length of webbing secured at said intersection and said second webbing end of said length of webbing secured to said plural ply webbing tongue thereby defining a vehicle seatbelt receiving loop of said vehicle seatbelt receiving structure at said intersection having a selected circumference and forward loop cant.

10. The vehicular safety restraint apparatus of claim 9 wherein said vehicle seatbelt receiving loop has a circumference no greater than about 32 cm, and wherein said selected distance is at least equivalent to width of said second length of webbing.

11. The vehicular safety restraint apparatus of claim 9 further comprising a breast strap across said dog head receiving harness loop formation and a torso strapping arrangement across said dog body receiving harness loop formation.

12. The vehicular safety restraint apparatus of claim 9 wherein said first and second webbings are 1.75" wide woven nylon webbing material meeting milspec class 2, type 7 specifications with a 6,000 to 10,000 pound load bearing strength.

13. The vehicular safety restraint apparatus of claim 9 wherein said intersection has a resulting five webbing ply structure.

14. The vehicular safety restraint apparatus of claim 9 wherein said plural ply webbing tongue has a resulting three webbing ply structure.

15. A method for forming a vehicular restraining apparatus mountable on a pet and engageable by a vehicle seatbelt, the method comprising the steps of:

cutting a first selected length of webbing;

securing the first selected length of webbing to itself at selected intermediate locations along the webbing thereby defining a first harness loop and a second harness loop formation each having ends spaced from the secured locations;

securing the ends of the first harness loop and the second harness loop formation to one another at an intersection;

cutting a second selected length of webbing establishing first and second webbing ends;

securing the first webbing end of the second selected length of webbing at the intersection so that the second selected length of webbing extends across the intersection;

extending the second selected length of webbing from the intersection a selected distance;

folding the second selected length of webbing back on itself after the selected distance forming a tongue extending from the intersection;

wrapping the second selected length of webbing around the intersection and the tongue;

securing the wrapped webbing at the intersection forming a first multi-ply webbing structure at the intersection; and securing together the tongue and the second webbing end of the second selected length of webbing to form a second multi-ply webbing structure and a vehicle seatbelt receiving loop adjacent to the intersection and the tongue;

whereby the vehicle seatbelt receiving loop is canted in a direction forward of the intersection.

16. The method for forming a vehicular restraining apparatus of claim 15 wherein the step of cutting a second selected length of webbing includes selecting the length to result in the vehicle seatbelt receiving loop having a circumference no greater than about 32 cm.

17. The method for forming a vehicular restraining apparatus of claim 15 wherein the selected distance is at least equivalent to webbing width.

18. The method for forming a vehicular restraining apparatus of claim 15 wherein the first and second selected lengths of webbings are 1.75" wide woven nylon webbing material meeting milspec class 2, type 7 specifications with a 6,000 to 10,000 pound load bearing strength.

19. The method for forming a vehicular restraining apparatus of claim 15 wherein 90 weight nylon thread is used for all webbing securement.

20. The method for forming a vehicular restraining apparatus of claim 15 wherein the multi-ply structures are at least three webbing ply structures.

* * * * *